J. P. FULGHUM.
Grain-Drills.
No. 145,795. Patented Dec. 23, 1873.
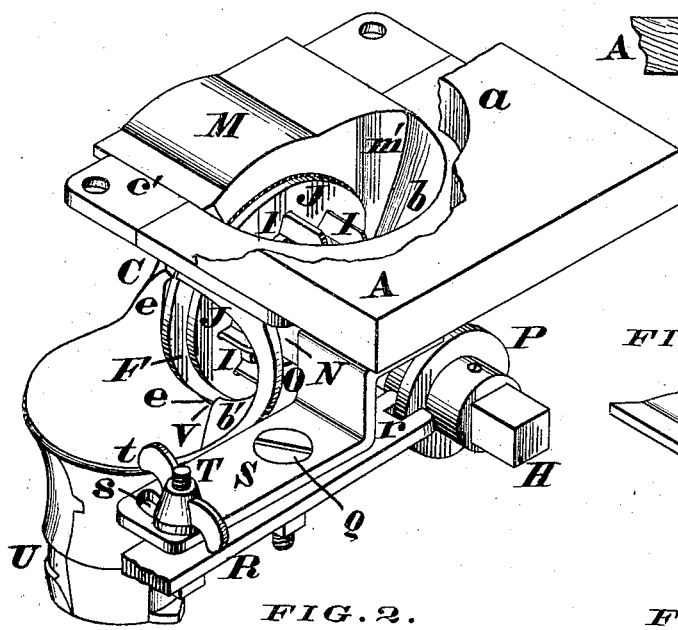
FIG. 1.
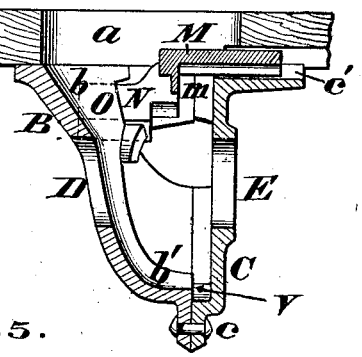
FIG. 4.
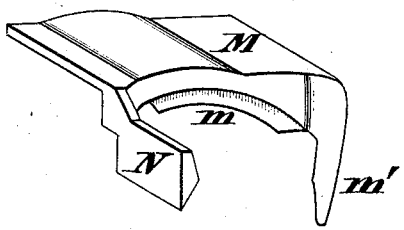
FIG. 5.
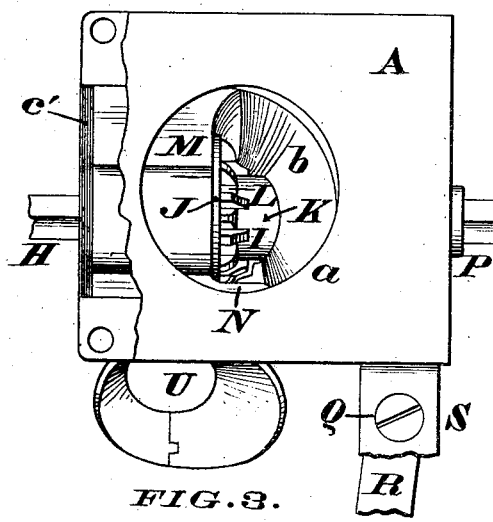
FIG. 2.
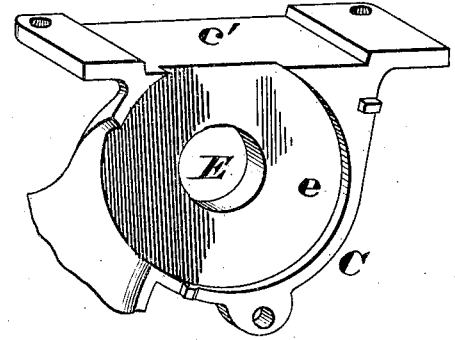
FIG. 6.
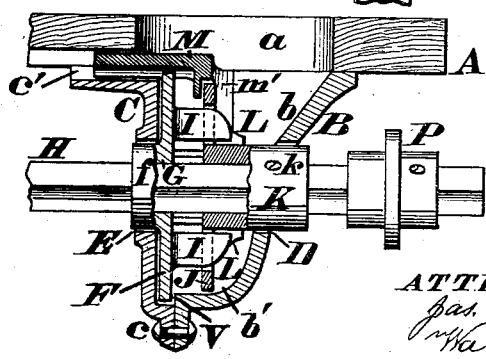
FIG. 3.
FIG. 7.
ATTEST.
Jas. H. Layman
Walter Allen
J. P. Fulghum
By Knight Bros.
ATT'YS.

UNITED STATES PATENT OFFICE.

JESSE P. FULGHUM, OF DUBLIN, INDIANA, ASSIGNOR TO HIMSELF AND WAYNE AGRICULTURAL COMPANY, OF SAME PLACE.

IMPROVEMENT IN GRAIN-DRILLS.

Specification forming part of Letters Patent No. 145,795, dated December 23, 1873; application filed August 22, 1873.

*To all whom it may concern:*

Be it known that I, JESSE P. FULGHUM, of Dublin, Wayne county, Indiana, have invented a new and useful Seeding Mechanism for Grain-Drills, of which the following is a specification:

This invention relates to that class of implements in which grain is conducted from the hopper to the delivery spout or tube by means of a feed-wheel or wallower that rotates within the seed cup or box; and it relates particularly to those rotary droppers in which provision is made for increasing or diminishing the capacity of the cup, and consequently the quantity of grain that is conducted into the delivery-tube, as hereinafter more fully described. My present invention consists in a peculiar combination of a box having a shaft-bearing in each end or side, a feed-wheel supported therein, a non-circular shaft arranged to slide axially, and a cut-off disk and guard-plate attached to the shaft, so as to slide therewith relatively to the loose feed-wheel and the box proper; also, in a peculiar combination of adjusting devices.

Figure 1 is a perspective view of my improved form of "cut-off," the hopper of the implement, and also the shifting-lever, being broken away, so as to exhibit more clearly the operative parts. Fig. 2 is a plan of the cut-off and its accessories. Fig. 3 is a vertical section through the seed-cup in the plane of the feed-shaft. Fig. 4 is another vertical section through the seed-cup, with the feed-wheel and cut-off removed. Fig. 5 is a perspective view of the shiftable plate or guard that prevents the entrance of grain between the feed-wheel and cut-off. Fig. 6 is a perspective view of the casting that constitutes the flat side of the seed-cup; and Fig. 7 is a perspective view of the feed-wheel and cut-off separated from each other, the latter having the sliding plate applied to it.

A represents a portion of the bottom of a grain-drill hopper, having an aperture, $a$, in it to admit seed to the cup or box, which is secured to the under side of said hopper. This seed cup or box consists essentially of two castings, B and C, of which the one, C, is a flat vertical plate, while the other one, B, has an inward slope, $b$, and a converging bottom, $b'$. The lower portions of these plates are united by a rivet or bolt, $c$. The castings B C are provided, respectively, with circular apertures D and E, for a purpose which will presently appear. The casting C has a circular depression or pit, $e$, for the reception of a disk, F, whose hub $f$ is adapted to rotate within the aperture E of said casting. The disk F, together with its hub $f$, is pierced with a non-circular aperture, G, through which the correspondingly-formed feed-shaft H passes loosely. This shaft may be rotated from the ground-wheels of the implement either by gearing, belts, or any other suitable mechanism. Projecting from the inner face of the disk F are a number of radial blades, I, that are adapted to engage with and occupy the correspondingly-shaped apertures $j$ of the adjustable cut-off disk J. The hub K of this cut-off is rigidly attached to the feed-shaft H by a screw or pin, $k$. Extending from the hub K to the disk J, and interposed between its apertures $j$, are a series of radial ribs, L, which ribs, in connection with the blades I, constitute the feeding mechanism proper. Perforated so as to fit snugly around, but to play easily upon, the feed-wheel, and adapted to be shifted simultaneously with the cut-off J, is a sliding plate, disk, or collar, M, that traverses a channel, $c'$, in the upper end of casting C; and said plate is provided with a flange, $m$, a tongue, $m'$, and a horizontally-projecting guide, N, which latter is adapted to play within a slot, O, in the casting B. The flange $m$ is located behind the disk J, while the tongue $m'$ projects down in front of the same, by which means any shifting movement of said disk is imparted directly to the sliding plate M. This shifting of the cut-off J and its accompanying guard-plate M is effected by a lever, R, whose forked end $r$ engages with a collar, P, that is secured to the feed-shaft H. The lever R is pivoted at Q to a bar, S, whose outer end is pierced with a slot, $s$, to receive a screw-threaded stud, T, that projects upwardly from said shifting-lever. A thumb-nut, $t$, or equivalent device, maintains said lever to any specific adjustment. U is a neck, to which the grain spout or tube may be applied in any approved manner. When the castings B and C are bolted together, a shoulder, V, is formed which shoulder maintains the disk F in its proper position within the circular recess e of the casting C.

When it is desired to pass a large quantity of grain through the seed-cup, the lever R is shifted so as to force the disk J closely back against the wheel F, which shifting of the disk J causes a corresponding retraction of the sliding gage-plate. The throat of the seed-cup is now unobstructed, and the blades I, together with the ribs L, are free to conduct all descending grain from the hopper into the neck U of the grain-tube. This arrangement of the cut-off mechanism is clearly shown in Fig. 1.

To limit the amount of grain passing through the seed-cup, it is only necessary to shift the lever R in such a manner as to advance the cut-off disk J and its accompanying gage-plate M, which movement not only contracts the throat of the feed-cup, but also reduces the projections of the blades I, and thereby diminishes the amount of grain that said blades and the ribs L are capable of delivering into the neck U. This limited capacity of the seed-cup is clearly shown in Figs. 2 and 3.

The lever R can be set at any intermediate position, so as to graduate the feed according to circumstances.

As the guard or gage-plate M is advanced or retracted simultaneously with the cut-off disk J, it will be seen that no opportunity is afforded for grain to enter between the two disks F and J, and consequently no accidental discharge of seed can occur. Neither can the operative parts ever become clogged or choked up.

The two disks F and J being arranged so as to rotate in unison with one another greatly simplifies the construction of my apparatus, and renders it much less liable to get out of order than it would be in case each disk was driven by independent gearing or other mechanism.

The employment of means for simultaneously contracting the feed-cup and the effective portion of the feed-wheel is not broadly claimed as new.

I claim as my invention—

1. The box composed of the castings B C, having the shoulder V formed therein, the loose feed-wheel F, supported within the box, the non-circular driving-shaft H, adapted to slide axially, and the cut-off disk J and guard-plate M, attached to the driving-shaft and sliding therewith, all constructed and combined substantially as herein described, for the purpose specified.

2. In combination with the shiftable and rotating driving-shaft H, with its attached cut-off disk J, the lever R r, bracket S s, stud and thumb-nut T t, and pivot Q, for the object designated.

In testimony of which invention I have hereunto set my hand.

JESSE P. FULGHUM.

Attest:
 GEO. H. KNIGHT,
 H. SCHOONMAKER.